United States Patent [19]

Riegl

[11] 4,415,404

[45] Nov. 15, 1983

[54] PROCESS OF ETCHING GLASS SURFACES, PARTICULARLY IN THE MANUFACTURE OF OPTICAL WAVEGUIDES

[75] Inventor: Ivan Riegl, Grafenau, Fed. Rep. of Germany

[73] Assignee: International Standard Electric Corporation, New York, N.Y.

[21] Appl. No.: 221,587

[22] Filed: Dec. 31, 1980

[30] Foreign Application Priority Data

Jan. 12, 1980 [DE] Fed. Rep. of Germany ....... 3000954

[51] Int. Cl.³ .............................................. C03C 15/00
[52] U.S. Cl. .................................... 156/635; 156/637; 156/639; 156/646; 156/654; 156/657; 156/663; 427/223; 427/237; 427/309
[58] Field of Search ................ 156/646, 639, 663, 635, 156/633, 654, 657, 637; 148/171; 427/85, 307, 223, 231, 237, 238, 309; 428/36, 426

[56] References Cited

U.S. PATENT DOCUMENTS 3,058,866 10/1962 Gunther et al. ..................... 156/663
4,217,027 8/1980 MacChesney et al. ............. 427/167

FOREIGN PATENT DOCUMENTS 1213900 11/1970 United Kingdom .
1456371 11/1976 United Kingdom .

Primary Examiner—Bruce H. Hess
Attorney, Agent, or Firm—John T. O'Halloran; Peter R. Ruzek

[57] ABSTRACT

A process of treating surfaces of silica or silicate glass, especially in preparation for subsequent coating in the manufacture of optical waveguides includes introducing a gaseous medium containing at least one component which forms hydrogen fluoride when sufficiently heated to the surface to be treated, while an etching zone which covers only a portion of the surface is thus heated, so that the hydrogen fluoride etches the surface only at the etching zone. The temperature is so selected that silicon tetrafluoride formed during the etching is oxidized and the resultant silicon dioxide is deposited from the gaseous medium onto the surface outside of the etching zone to form a fused fluorine-doped vitreous layer on the previously etched portion of the surface.

11 Claims, 1 Drawing Figure

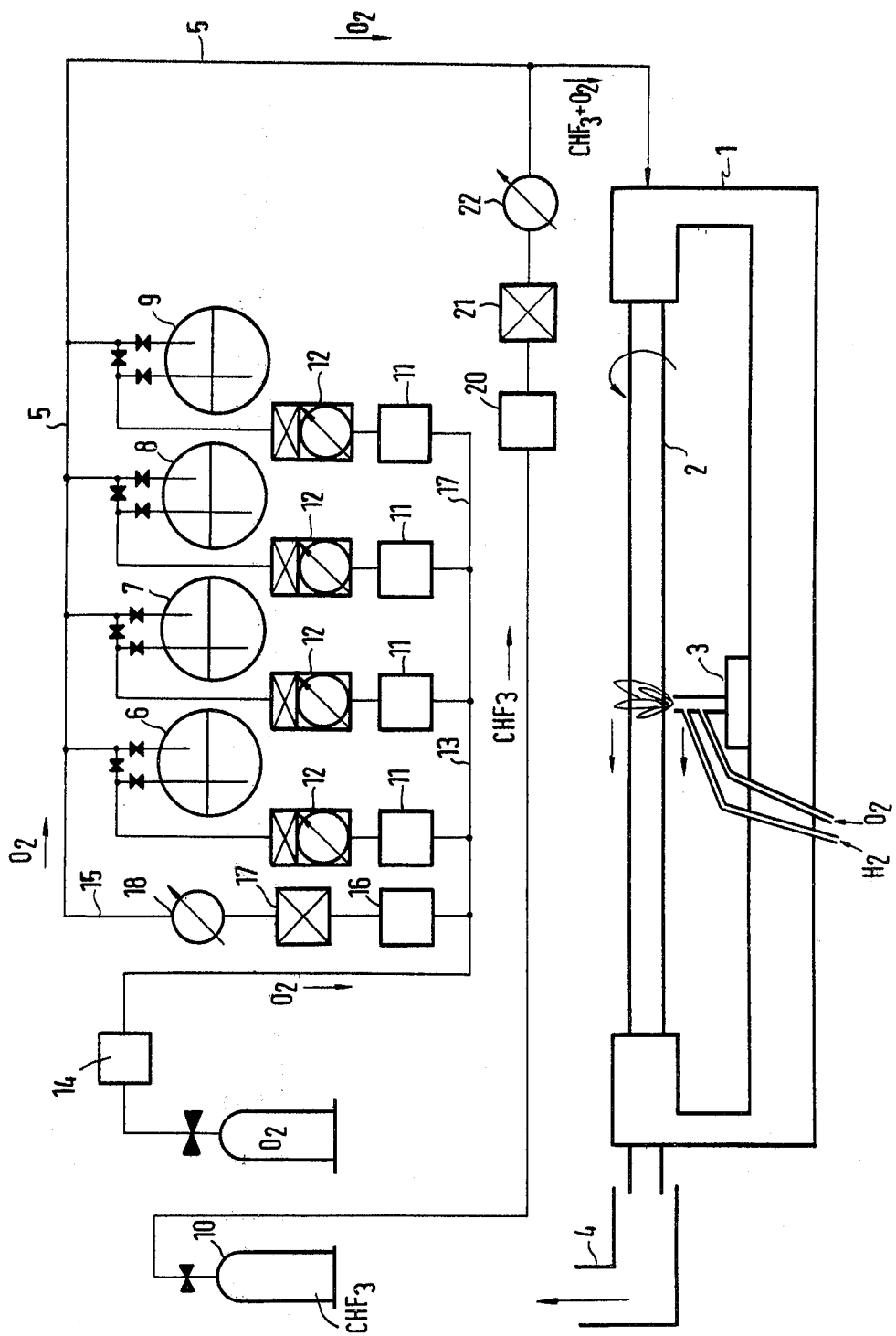

PROCESS OF ETCHING GLASS SURFACES, PARTICULARLY IN THE MANUFACTURE OF OPTICAL WAVEGUIDES

FIELD OF THE INVENTION

The invention relates to a process of etching surfaces of silica glass or silicate glass with hydrogen fluoride, particularly in the course of preparing the interior surface of a substrate tube to be coated for the manufacture of optical waveguides.

One such process is known from the article by R. G. Sommer, R. D. Deluca and G. E. Burke "New Glass System for Low-Loss Optical Waveguides" as published on pages 408 to 409 of Electronics Letters, Vol. 12, No. 16 of Aug. 5, 1976. The interior of the substrate tube of either silica or silicate glass is etched by being washed with a hydrous solution of hydrogen fluoride (hydrofluoric acid). After this the thus treated substrate tube must still be rinsed with high-purity water for a longer period of time and dried, for example, in a stream of nitrogen. Subsequently, the tube is firepolished and then ready for the interior coating which is carried out in accordance with the well-known chemical vapor-phase-reaction deposition (CVD) process. This conventional etching process aimed at preparing a substrate tube for the interior coating, however, has the disadvantage of involving quite a considerable chemical-technical investment for reconditioning the high-purity water, high costs for the required high-purity acid (or acids), and of raising problems concerning the disposal of the used acids. To this there is added the considerable investment in time required for carrying out this technique.

OBJECT OF THE INVENTION

It is the object of the invention, therefore, to provide a process of the kind mentioned hereinbefore which permits to carry out a quicker and substantially more cost-effective etching which no longer calls for any costly subsequent treatment.

SUMMARY OF THE INVENTION

This object is achieved by employing a process of etching surfaces of silica glass or silicate glass with hydrogen fluoride, particularly in the course of preparing the interior surface of a substrate tube to be coated for the manufacture of optical waveguides, wherein a chemical vapor-phase reaction is carried out within a localized heating zone in the proximity of the surface to be etched, which produces the hydrogen fluoride.

The process according to the invention offers the particular advantage that, when a higher reaction temperature is chosen, any further eventually necessary process steps for the treatment of glass surfaces can be carried out at the same time without involving any additional investment, viz. the firepolishing and the deposition of a fluorine-doped layer of silicon dioxide.

BRIEF DESCRIPTION OF THE DRAWING

The single drawing FIGURE illustrates schematically the features of the invention.

DESCRIPTION OF THE PREFERRED EMBODIMENTS

The invention will now be explained in greater detail by way of example and with reference being had to the accompanying single drawing. This drawing shows a system for interiorly coating a substrate tube for producing a glass-fiber preform. The system consists substantially of the conventional horizontal glass-working lathe 1 in which the substrate tube 2 whose interior wall is to be coated, is clamped, and of the gas station as shown in the upper part of the drawing, which supplies the gas/vapor mixture intended to cause the reaction inside the substrate tube.

It should be noted already at this point of the specification that this system which is suitable for also carrying out the process according to the invention, only differs from the conventional system for the interior coating of substrate tubes, in that the gas station is enlarged by one more gas bottle which is capable of being connected in parallel with the evaporator bottles to a collecting pipe. Therefore, only a rough outline is given of both the horizontal glass-working lathe and the evaporator bottles.

The substrate tube 2 of either silica glass or a silicate glass can be clamped in drill chucks (not shown) on the lathe and rotated about its longitudinal axis at any selectable rotational speed, in that both drill chucks rotate synchronously with one another and non-slippingly. Displaceable in parallel with the longitudinal axis of the substrate tube 2, there is arranged an external hydrogen-oxygen burner 3 for producing from the outside a travelling heating zone inside the substrate tube, which is required for carrying out various chemical vapor-phase reactions.

At one end of the substrate tube an exhaust pipe 4 is provided for removing the wate gas resulting from the reaction inside the substrate tube. To the other end of the clamped substrate tube, via a gas-tight rotary transmission (not shown), there is connected a collecting pipe 5 via which the vaporous reactants for the chemical vapor-phase reaction to be carried out, can be introduced into the substrate tube. This collecting pipe 5 is the starting pipe of the gas station which is built up as follows:

Evaporator bottles 6, 7, 8, 9, partly filled with various liquid chemicals are connected in parallel on the input side, each one via filters 11 and flow controls 12, to an oxygen pipe 13. Via this oxygen pipe 13, the oxygen serving both as a carrier gas and a reaction gas, subsequently to the drying in a drier 14, and upon opening of the suitable valves, can be introduced into the respective one of the evaporator bottles 6, 7, 8, 9. The entrance pipe serving this purpose respectively extends into the liquids, so that the flowing-in oxygen bubbles through the liquids and absorbs the vapors thereof up to the stage of saturation. The gas-vapor mixture, resulting in the course of this in each of the evaporator bottles within the gas space above the liquid, is now permitted to flow via an outlet pipe only extending into the gas space of the respective bottle, into the collecting pipe 5 to which outlet pipes of all evaporator bottles are connected in parallel. Here, a pure, dry oxygen flowing through a shunt pipe 15 connecting the oxygen pipe 13 to the collecting pipe 5, is admixed to the gas-vapor mixture. This shunt pipe 15 comprises a filter 16, a control valve 17, and a flowmeter 18, all arranged in series.

As already mentioned, the shown evaporator bottles are not needed to carry out the process according to the invention.

In the following, the contents of the evaporator bottles 6, 7, 8, and 9 containing the initial reactants required for the actual interior-coating process, are no longer referred to.

Now the substrate tube is prepared as follows for the known interior coating:

Outside the horizontal glass-working lathe the tube is at first cleaned only quite roughly by being washed through, for example, with a suitable solvent, such as chloroform or trichlorethane. This cleaning may also be carried out in a steam-bath. After this, the substrate tube 2 is clamped without any further preliminary treatment into the latche 1 and aligned. At the beginning, the hydrogen-oxygen burner 3 is positioned at that particular end of the substrate tube which is connected to the collecting pipe 5 (i.e. on the righthand side of the drawing).

The evaporator bottles 6, 7, 8, and 9 not serving the etching, but the interior coating, are put out of operation by closing the valves arranged in the entrance and outlet pipes of these bottles.

A number of different initial reactants are suitable for carrying out the etching process. These reactants must have the essential feature of containing fluorine and hydrogen. For example, it is possible to use gaseous trifluorinemethane ($CHF_3$) which is kept ready for use in the gas bottle 10 which, via a filter 20, a control valve 21 and a flowmeter 22, is connected to the collecting pipe 5. Now the valves and flowmeters both of this gas bottle 10 and of the shunt pipe 15 are set in such a way that a gas-vapor mixture of oxygen and $CHF_3$ will flow in a suitable proportion through the collecting pipe 5 and into the substrate tube 2. While this mixture is being introduced, the tube is rotated and the external hydrogen-oxygen burner is moved in the direction of flow (from right to left) parallel to the longitudinal axis of the tube, thus producing a traveling heating zone in which the trifluorinemethane chemically reacts with the oxygen in the vapor phase.

When the temperature within the reaction space is maintained approximately at 800° C., substantially the following reactions will take place:

$$CHF_3 + O_2 \rightarrow CO_2 + HF + F_2 \qquad (a)$$

$$SiO_2 + 4HF \rightarrow SiF_4 + 2H_2O \qquad (b)$$

$$2H_2O + 2F_2 \rightarrow 4HF + O_2 \qquad (c)$$

$$CO_2 + 2F_2 \rightarrow CF_4 + O_2 \qquad (d)$$

Further intermediate or secondary reactions are not referred to herein as they would not contribute anything towards a better understanding of the invention.

As can be seen from reaction (b), the interior wall of the substrate tube is etched in that the gaseous hydrogen fluoride (HF) as formed during reaction (a), reacts with the silicon dioxide ($SiO_2$) by forming a gaseous silicon-tretrafluoride ($SiF_4$). This causes a thin $SiO_2$-layer to be removed, with the thickness thereof depending on the quantity of gas flow and on the speed at which the burner is advanced. Accordingly, there is concerned a chemical vapor-phase-reaction etching process which can be carried out along the tube with a good degree of uniformity. If, on the other hand, it were to be attempted to etch the substrate tube by the introduction of gaseous hydrogen fluoride produced externally, an etching would chiefly take place at the end of the tube only, i.e. at the end where the hydrogen fluoride would be introduced.

It should be noted that with this etching process no residual water reamins inside the substrate tube, which would be likely to cause the well-known unwanted contaminations on both the tube and the optical waveguide resulting therefrom. According to reaction (c), water is prevented from originating owing to the presence of fluorine, and instead of this hydrogen fluoride and oxygen are formed.

Following the process step of etching by way of chemical vapor-phase reaction, for which one single passage of the burner is sufficient, the etched tube is subjected to fire-polishing in the usual way on the lathe, and is thus already prepared for the interior-coating process to be carried out by using the contents of the remaining evaporator bottles 6 through 9, and which may take place immediately thereafter.

Instead of trifluormethane ($CHF_3$), it is also possible to use as gaseous initial reactants in the process described herein, any other gaseous partially fluorinated hydrocarbons which, just like $CHF_3$, contain at least one hydrogen residual atom.

Irrespective of the foregoing, also such mixtures are suitable for being used as gaseous initial reactants, whose one component contains fluroine and whose other component contains hydrogen. In this case, as the first-mentioned component it is suitable to use a partially fluorinated or completely fluorinated hydrocarbon without any hydrogen residual atoms and, as the second component, any fitting compound containing hydrogen.

Corresponding examples are:
(1) Hexafluorethane ($C_2F_6$) and Ethane ($C_2H_6$)
(2) Chlortrifluormethane ($CClF_3$) and Methylchloride ($CClH_3$)
(3) Tetrafluormethane ($CF_4$) and Methane ($CH_4$).

Since with these gas mixtures each time the one component contains as many fluorine atoms in the molecule as hydrogen atoms are contained in the other component, this may be regarded as a favorable prerequisite for the existing hydrogen to react completely with the existing fluorine and not with the oxygen, so that the aforementioned contaminations by OH ions are avoided.

Apart from the gaseous initial reactants, however, also liquid reactants are suitable for being used. These are then kept ready in an additional evaporator bottle (not shown) instead of in a gas bottle which may be omitted in the case of using liquid initial reactants. This additional evaporator bottle is of the same design as the shown evaporator bottles 6, 7, 8, and 9, and arranged in parallel therewith. For etching the substrate tube the shown evaporator bottles remain out of operation and only the additional evaporator bottle containing the liquid reactant for the etching agents of a chemical vapor-phase reaction process is bubbled through by a carrier gas, such as oxygen, so that the initial reactant in a vaporous state, together with oxygen, is introduced into the substrate tube.

As the initial reactant is the evaporator bottle it is possible to use a liquid, easily vaporizable partially fluorinated compound containing at least one hydrogen residual atom, such as trifluorethanol ($C_2H_2F_3O$).

Similar as with the aforementioned gaseous initial reactants it is possible to use as initial reactants also mixtures of which the one component contains fluorine and of which the other component contains hydrogen.

The first component may be a partially fluorinated or completely fluorinated hydrocarbon without any hydrogen residual atoms, and the other one may be a compound containing hydrogen, fitting to the first component. For example, a mixture of trichlortrifluorethane ($C_2Cl_3F_3$) and methanol ($CH_3OH$) is suitable for being used as a liquid, volatile initial reactant.

Irrespective of what initial reactans are used in the chemical vapor-phase reaction for forming the the hydrogen fluoride, further and sometimes desirable processes take place when permitting the chemical vapor-phase reaction to be carried out at a higher temperature ranging between 1400° and 1700° C.: There is then carried out a further chemical vapor-phase reaction in the course of which the gaseous silicon-tetra-fluoride ($SiF_4$) as set free during the etching process, reacts with the oxygen as follows:

$$SiF_4 + O_2 \rightarrow SiO_2 + 2F_2.$$

The silicondioxide resulting in the course of this deposits in a powdery shape from the vapor phase on the previously etched interior wall of the silicia-glass tube and, within the heating zone, is fused to result in a glassy layer. Accordingly, there is involved a "recovery" of the silicondioxide as removed by the etching. In the vapor phase the silicondioxide is cleaned and doped with the resulting fluorine, so that a fluorine-doped layer of silicondioxide is produced on the interior wall of the tube. This layer can be utilized as an optical coating for the optical waveguide to be manufactured.

In this particular case and owing to the increased temperature, firepolishing of the tube is carried out together with the chemical vapor-phase reaction process.

Immediately after the completion of the etching process the actual interior coating may be started.

It should still be noted for the sake of completeness that subsequently to the completion of the interior-coating process the gas station is turned off and the rotating silica-glass tube is caused to collapse at an increased temperature of the flame at the burner's tip in the course of several passages. From the thus produced rod-shaped preform the optical waveguide is subsequently drawn in a fiber-drawing apparatus.

It is still to be emphasized that the described process of etching in the gas phase is in no way restricted to the treatment of the interior wall of a tubing. Apart from the given example of embodiment, the process is equally well suitable for etching other surfaces of silica glasses or silicate glasses by producing a heating zone in the proximity of the surface to be etched and by introducing therein either a gas mixture or a gas-vapor mixture of the kind as mentioned hereinbefore.

I claim:

1. A process of treating surfaces of silica glass or silicate glass, particularly in the course of preparing an internal surface of a tubular substrate for subsequent coating during the manufacture of optical waveguides, comprising the steps of introducing to the surface to be treated a gaseous medium containing at least one component from which hydrogen fluoride is formed when the temperature of the gaseous medium exceeds a predetermined level; raising the temperature of an etching zone extending only over a portion of the surface to at least the predetermined level to form hydrogen fluoride in the gaseous medium and have the same etch the surface only at the etching zone; and effecting relative movement between the etching zone and the surface until all portions of the latter have been etched.

2. The process as defined in claim 1, wherein said raising step includes heating the etching zone to a temperature at which oxygen present at the etching zone reacts with the aforementioned component.

3. The process as defined in claim 2, wherein said introducing step includes incorporating oxygen in the gaseous medium.

4. The process as defined in claim 1, wherein said raising step includes heating the etching zone to a temperature at which oxygen present at the etching zone oxidizes silicon tetrafluoride developed during the etching to silicon dioxide which permeates the gaseous medium and deposits on the surface outside of the etching zone together with fluorine present in the gaseous medium to form a fused vitreous fluorine-doped silica layer on the previously etched portion of the surface.

5. The process as defined in claim 1, wherein said introducing step includes feeding the gaseous medium into the interior of a tubular substrate; wherein said raising step includes applying heat to the exterior of the tubular substrate at the etching zone; and wherein said effecting step includes effecting relative movement between the zone at which heat is applied and the tubular substrate longitudinally and circumferentially of the latter.

6. The process as defined in claim 1, wherein the component is a partially fluorinated hydrocarbon compound having at least one residual hydrogen atom.

7. The process as defined in claim 1, wherein the gaseous medium contains at least two components reactable with one another to form hydrogen fluoride, one of the components being at least partially fluorine-substituted hydrocarbon compound and the other component being a hydrogen-containing compound.

8. The process as defined in claim 1, wherein said introducing step includes entraining vapor of the component in a carrier gas.

9. The process as defined in claim 8, wherein the entraining step includes passing oxygen as the carrier gas through a liquid body containing the component for entraining vapor of the component therein.

10. The process as defined in claim 9, wherein the liquid body contains at least one partially fluorinated hydrocarbon compound having at least one residual hydrogen atom.

11. The process as defined in claim 9, wherein the liquid body contains at least one at least partially fluorinated hydrocarbon compound and at least one hydrogen-containing compound.

* * * * *